United States Patent
Xiong et al.

(10) Patent No.: US 10,384,352 B1
(45) Date of Patent: Aug. 20, 2019

(54) FINGER OF ROBOTIC HAND AND ROBOT HAVING THE SAME

(71) Applicant: UBTECH Robotics Corp, Shenzhen (CN)

(72) Inventors: Youjun Xiong, Shenzhen (CN); Kunlei Zhao, Shenzhen (CN); Wenhua Yu, Shenzhen (CN); Qi Zhao, Shenzhen (CN); Jiawen Hu, Shenzhen (CN); Yangyu Pi, Shenzhen (CN); Jianxin Pang, Shenzhen (CN)

(73) Assignee: UBTECH Robotics Corp, Shenzhen (CN)

( * ) Notice: Subject to any disclaimer, the term of this patent is extended or adjusted under 35 U.S.C. 154(b) by 0 days.

(21) Appl. No.: 16/233,131

(22) Filed: Dec. 27, 2018

(30) Foreign Application Priority Data

Oct. 31, 2018 (CN) .......................... 2018 1 1289986

(51) Int. Cl.
| | |
|---|---|
| *B25B 15/00* | (2006.01) |
| *B25J 15/06* | (2006.01) |
| *B25J 15/08* | (2006.01) |
| *B25J 15/00* | (2006.01) |

(52) U.S. Cl.
CPC .......... *B25J 15/08* (2013.01); *B25J 15/0009* (2013.01)

(58) Field of Classification Search
CPC .............................. B25J 15/08; B25J 15/0009
USPC ..................... 294/106, 111; 901/25, 31, 32
See application file for complete search history.

(56) References Cited

U.S. PATENT DOCUMENTS

| | | | | | |
|---|---|---|---|---|---|
| 2,549,074 | A | * | 4/1951 | Fishbein | A61F 2/583 623/64 |
| 2,549,716 | A | * | 4/1951 | Simpson | A61F 2/583 623/58 |
| 3,413,658 | A | * | 12/1968 | Becker | A61F 2/583 267/151 |
| 4,364,593 | A | * | 12/1982 | Maeda | A61F 2/588 294/106 |
| 5,080,682 | A | * | 1/1992 | Schectman | A61F 2/583 294/111 |
| 5,378,033 | A | * | 1/1995 | Guo | A61F 2/583 294/115 |
| 8,297,672 | B2 | * | 10/2012 | Kim | B25J 9/104 294/106 |
| 9,016,744 | B2 | * | 4/2015 | Starkey | A61F 2/583 294/106 |
| 2005/0121929 | A1 | * | 6/2005 | Greenhill | B25J 9/1075 294/106 |
| 2014/0042760 | A1 | * | 2/2014 | Yu | B25B 9/00 294/111 |
| 2018/0140441 | A1 | * | 5/2018 | Poirters | A61F 2/54 |

* cited by examiner

*Primary Examiner* — Paul T Chin

(57) ABSTRACT

A finger of a robotic hand includes a phalanx portion including at least two phalanxes rotatably coupled to each other, a rotating member that is rotatable with respect to the phalanx portion, a rope having two opposite ends respectively connected to one phalanx and the rotating member, a rotating cam driven by a driving device and having a lateral surface that stays in contact with the rotating member, the rotating cam being configured to push the rotating member to rotate the rotating member in a first direction, and an elastic member connected to the rotating member and configured to apply a force to the rotating member to rotate the rotating member in a second direction.

10 Claims, 6 Drawing Sheets

FINGER OF ROBOTIC HAND AND ROBOT HAVING THE SAME

CROSS REFERENCE TO RELATED APPLICATIONS

This application claims priority to Chinese Patent Application No. 201811289986.3, filed Oct. 31, 2018, which is hereby incorporated by reference herein as if set forth in its entirety.

BACKGROUND

1. Technical Field

The present disclosure generally relates to robots, and particularly to a finger of a robotic hand and a robot including the finger.

2. Description of Related Art

Manipulable hand-like apparatuses are utilized in several industries. One such apparatus is a multi-fingered robotic hand. The multi-fingered robotic hand includes a plurality of digits capable of performing certain grasping operations. It is always desirable and useful to provide a robotic hand that is simple in structure and has damage-proof ability in certain scenarios.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
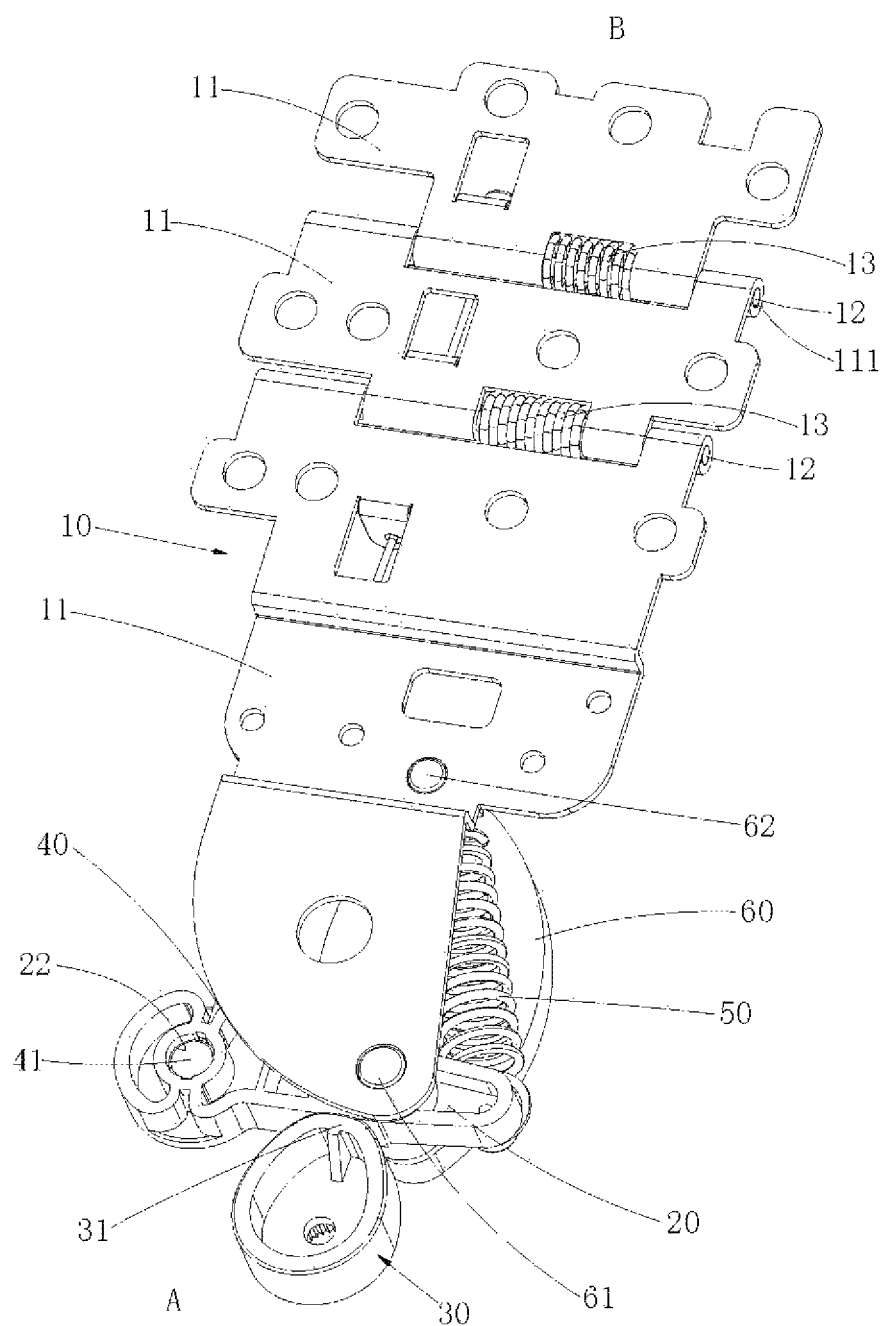
FIG. 1 is a schematic isometric view of a finger of a robotic hand according to an embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 2:
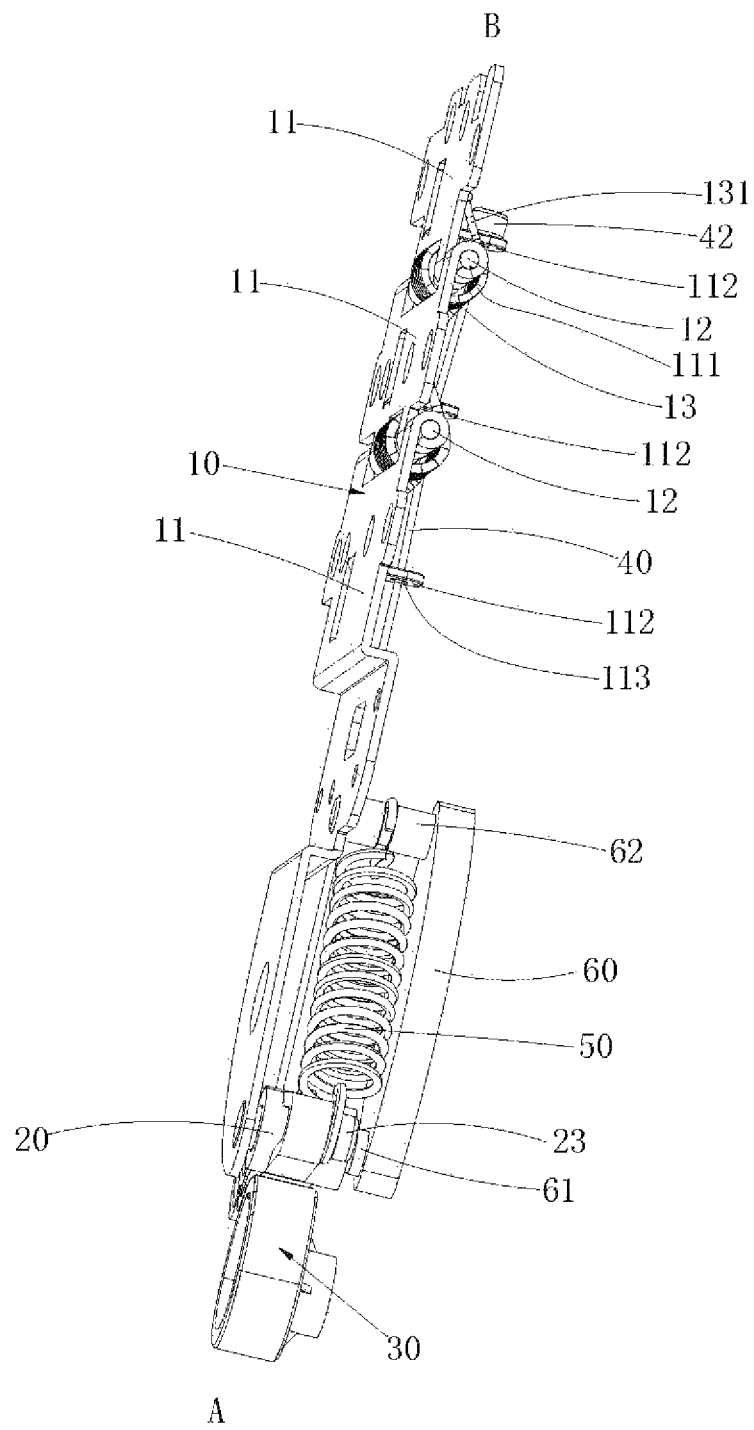
FIGS. 2 and 3 are similar to FIG. 1, but viewed from a different perspective.
Figure 3:
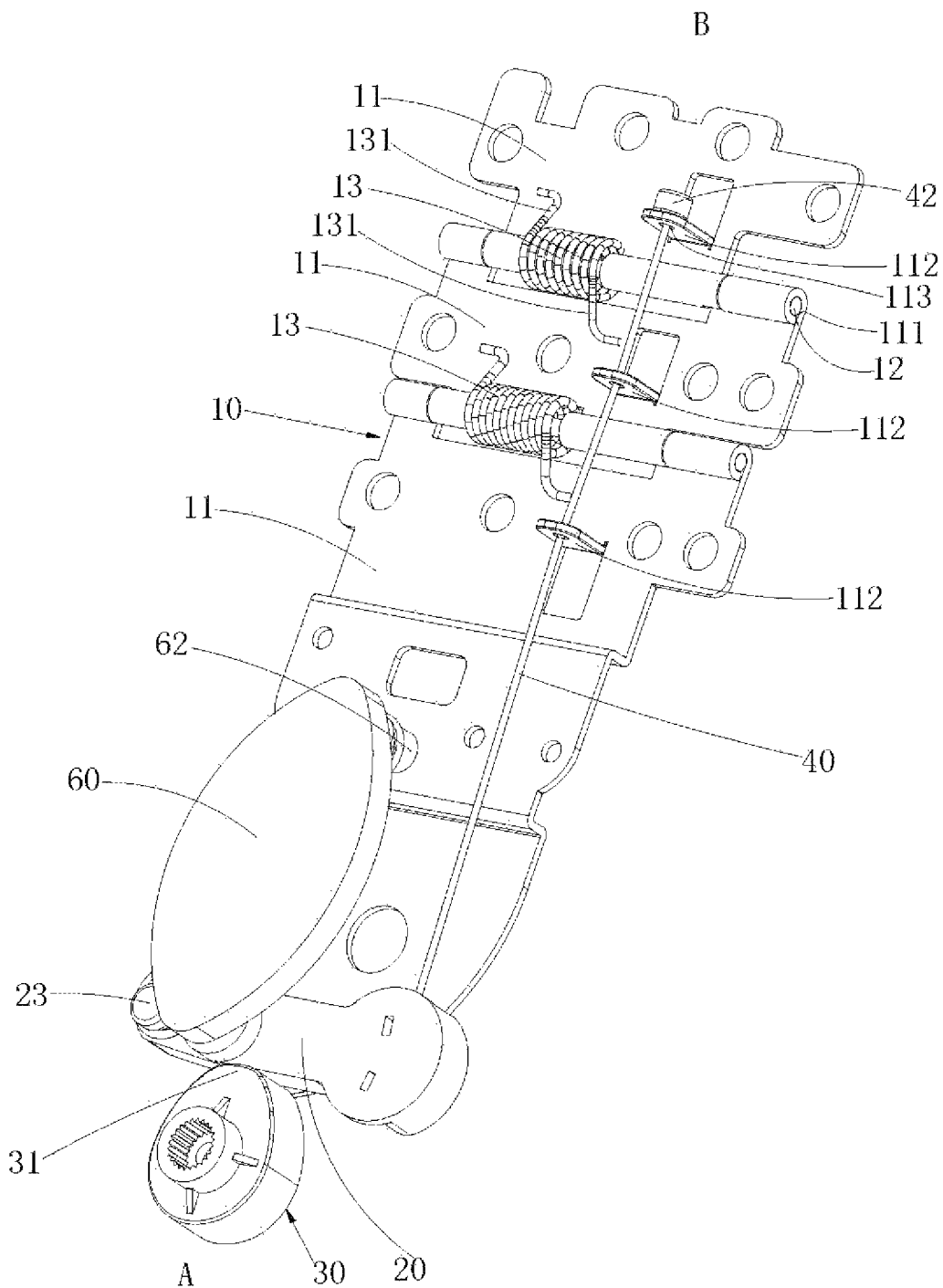
Figure 5:
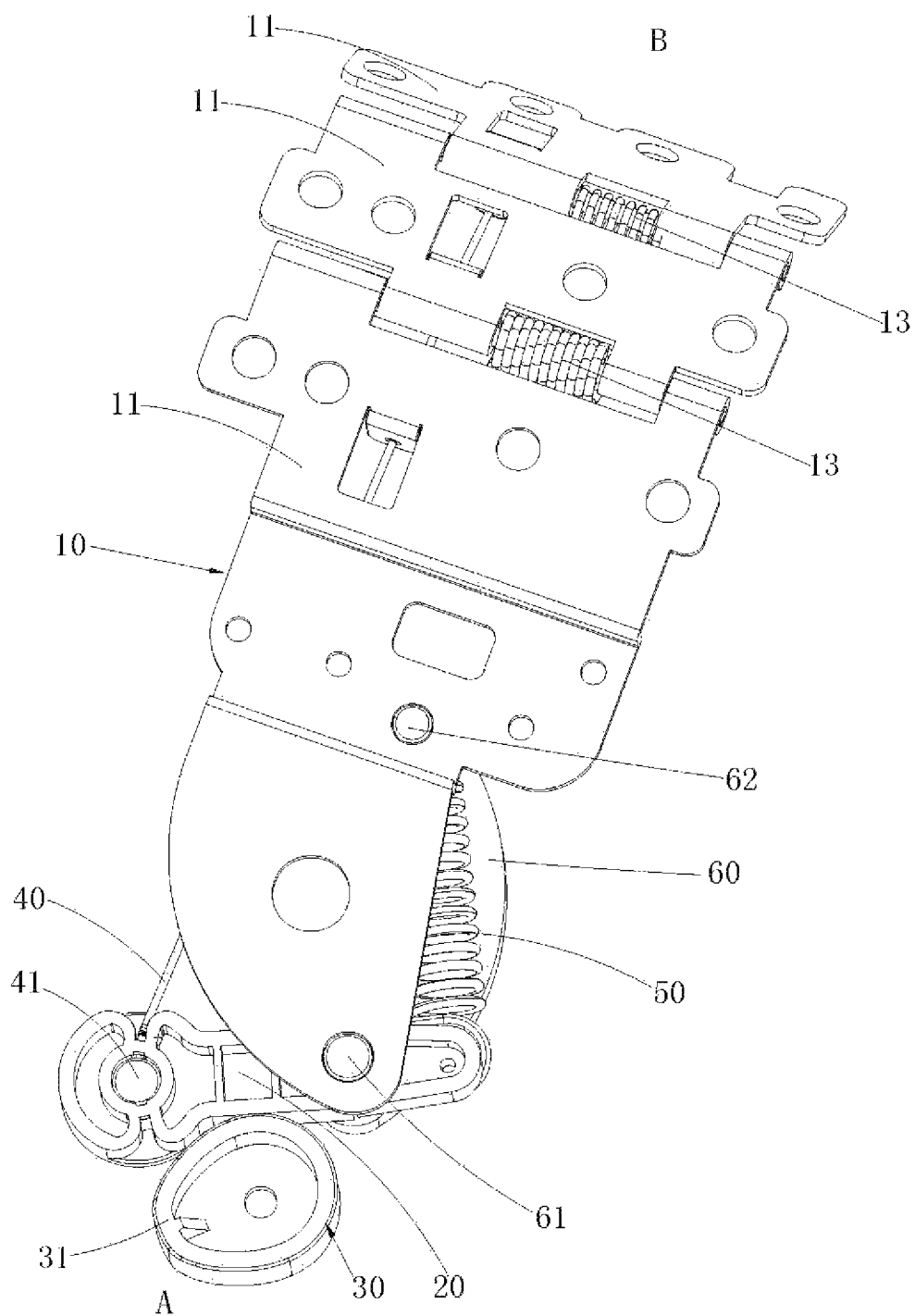
FIG. 5 is a schematic isometric view of the finger of FIG. 1 in a flexed state.

Referring to FIGS. 1-3, a finger 100 of a robotic hand includes a phalanx portion 10, a rotating member 20, a rotating cam 30, a rope 40 and an elastic member 50. The phalanx portion 10 includes at least two phalanxes 11 rotatably coupled to each other and has an end A (lower end in FIG. 1) and an end B (upper end in FIG. 1). The rotating member 20 is rotatable with respect to the phalanx portion 10. The rope 40 has two opposite ends respectively connected to one of the at least two phalanxes 11 (i.e. the phalanx 11 having the end B) and the rotating member 20. The rope 40 is used to pull the phalanx 11 to rotate. The rotating cam 30 is driven by a driving device (e.g. a servo) and includes a lateral surface 31 that stays in contact with the rotating member 20. The rotating cam 30 is used to push the rotating member 20 to rotate the rotating member 20 in a first direction (i.e. counterclockwise direction in FIG. 3). The elastic member 50 is connected to the rotating member 20 and used to apply a force to the rotating member 20 to rotate the rotating member 20 in a second direction (i.e. clockwise direction in FIG. 3). The second direction is different from the first direction. When the rotating member 20 rotates in one of the first direction and the second direction, the rope is pulled by the rotating member 20 and then pulls the one of the at least two phalanxes 11 to rotate. The phalanx 11 then pulls an adjacent phalanx 11 to rotate. Rotation of the phalanxes 11 will cause the finger 100 to flex (see FIG. 5) or extend (see FIG. 1).

During operation, the driving device drives the rotating cam 30 to rotate, and the rotating cam 30 then drives the rotating member 20 to rotate. When the rotating member 20 of FIG. 4 rotates in a clockwise direction, the rotating member 20 pulls the rope 40 to move. The rope 40 then pulls the uppermost phalanx 11 to rotate. The phalanx 11 then pulls an adjacent phalanx 11 to rotate toward the rotating member 20, which causes the finger 100 to flex. When the rotating member 20 of FIG. 4 rotates in a counterclockwise direction, two torsion springs, which will be described in detail later, will rebound and cause the two phalanxes 11 to rotate away from the connection assembly 30, which causes the finger 100 to extend.

The finger above has the following advantages: The finger requires less components and its structure is simple. Flexion and extension of the finger can be achieved through engagement of the rope 40, the rotating member 20, the rotating cam 30 and the elastic member 50. By selecting a proper elastic member 50, desirable bending state of the finger can be realized with one degree of freedom. The finger can flex so as to avoid damage from hard shocks. The driving device 50 can be set to operate at a non-limit state, which effectively avoid damage due to failure of the driving device 50. Because of the elastic member 50, the finger can always be flexed to avoid damage caused by hard impact when the finger is subjected to any external force.

The driving device can be set to operate at a non-limit state, which effectively avoid damage due to failure of the driving device.

Each phalanx 11 is made of sheet metal and defines a mounting hole for connection with a fastener such that the phalanx 11 can be connected with other component.

The cam 30 has an irregular contour and defines a central hole for connection with the driving device. For example, when the driving device is a servo having an output shaft, the central hole is sized and shaped to allow the output shaft to fit therein so that the cam 30 can be connected to the output shaft. The rope 40 may be a flexible wire rope.

In one embodiment, the finger 100 further includes a base 60 and an axle 61 protruding from the base 60. The rotating member 20 defines a mounting hole 21, and the axle 61 is rotatably fit in the mounting hole 21 so as to rotatably connect the rotating member 20 to the base 60. With such configuration, it is easy to assemble the phalanx portion 10 and the rotating member 20 together. An end of the axle 61 is fixed to the phalanx portion 10 adjacent to the end A.

In one embodiment, the finger 100 further includes a post 62 protruding from a side of the base 60 where the axle 61 is located and spaced apart from the axle 61. An end of the post 62 is fixed to the phalanx portion 10. The base 60 is thus fixed to the phalanx portion 10 through the axle 61 and the post 62.

A first end of the elastic member 50 is connected to the rotating member 20 and a second opposite end of the elastic member 50 is connected to the post 62. The elastic member 50 is in a stretched state and applies a push force to an end of the rotating member 20. Since the cam 30 has an irregular contour and a lateral surface that stays in contact with the rotating member 20, the distance between the rotation axis of the cam 30 and the contact point of the cam 30 with the rotating member 20 changes as the cam 30 rotates. When distance gradually decreases as the cam 30 rotates, the rotating member 20 will be pulled by the elastic member 50 and rotate and pull the rope 40 to move, which will cause the finger 100 to flex. In the embodiment, the rotating member 20 includes a post 23 and an end of the elastic member 50 is fixed to the post 23.

Figure 4:
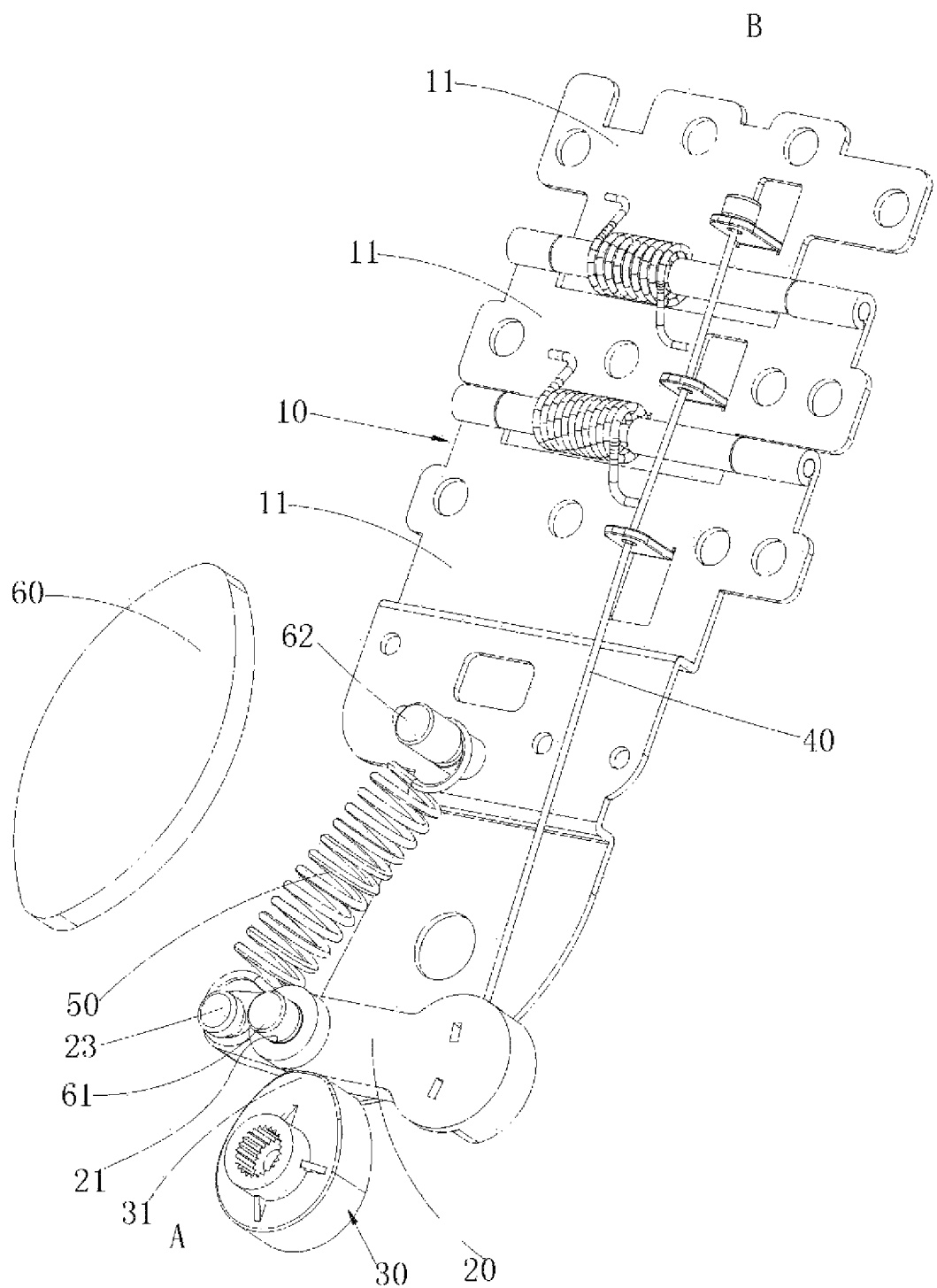
FIG. 4 is an isometric partially exploded view of the finger of FIG. 1.

Referring to FIG. 4, in the embodiment, the number of the phalanxes 11 is three. The three phalanxes 11 are sequentially, rotatably connected to one another. Each of the phalanxes 11 defines an axle hole 111. An axle 12 is fixed in the axle hole 111 of one phalanx 11 and rotatably fit in the axle hole 111 of the adjacent phalanx 11 so as to rotatably connect two adjacent phalanxes 11 together. In the embodiment, the axle hole 111 is formed by bending an edge of each phalanx 11.

In one embodiment, a torsion spring 13 is arranged around each axle 12 and includes two arms 131 respectively abutting against two phalanxes 11 connected by the axle 12. During flexion of the finger 100, the torsion springs 13 will be twisted. When the distance between the rotation axis of the cam 30 and the contact point of the cam 30 with the rotating member 20 increases as the cam 30 rotates, the end of the rotating member 20 connected to the rope 40 will move toward the phalanx portion 10. The torsion springs 13 then rebound and urge the phalanxes 11 to rotate away from the rotating member 20, which causes the finger 100 to extend.

In one embodiment, each of the phalanxes 11 includes a protruding tab 112, defining a through hole 113 that allows the rope 40 to pass therethrough. When the rope 40 is pulled to move toward the end A, the rope 40 pulls the phalanxes 11 to rotate, which causes the finger 100 to flex.

In one embodiment, the rotating member 20 defines a cavity 22 and the rope 40 includes two heads 41, 42 at opposite ends thereof. The head 41 is received in the cavity 22 so as to connect the rope 40 to the rotating member 20.

The other head 42 abuts against one of the tabs 112 (i.e. the tab of the uppermost phalanx 11 in FIG. 4), which allows the rope 40 to apply a pulling force to the tab 112. When the rope 40 is pulled to move toward the end A, the pulling force from the rope 40 is transmitted to the uppermost phalanx 11 in FIG. 4 through the engagement of the head 42 with the tab 112. The uppermost phalanx 11 and its adjacent phalanx 11 then rotate, which causes the finger 100 to flex.

In one embodiment, the elastic member 50 is connected to a first end of the rotating member 20, and one of the ends of the rope 40 is connected to a second end of the rotating member 20 which is opposite the first end. The elastic member 50 and the rope 40 are located at the same side of the rotating member 20. A rotation axis of the rotation member 20 is located between the rope 40 and the elastic member 50. When the rope 40 is pulled to move toward the end A, the rope 40 is pulled to move toward the end A and causes the uppermost phalanx 11 and its adjacent phalanx 11 to rotate, which causes the finger 100 to flex.

As shown in FIG. 4, in the embodiment, the elastic member 50 applies a pulling force to the rotating member and can pull the rotating member 20 to rotate in a clockwise direction. The cam 30 applies a pushing force to the rotating member 20 and can push the rotating member 20 to rotate in a counterclockwise direction. The contact area of the cam 30 with the rotating member 20 is located between the rotation axis of the rotating member 20 and the rope 40.

In one embodiment, the cam 30 is located at one side (lower side in FIG. 4) of the rotating member 20, and the elastic member 50 and the rope 40 is located at the other side (upper side in FIG. 4).

In one embodiment, the two axles 12 connecting the three phalanxes 11 are parallel to each other. The phalanxes 11 rotate about an axis that is perpendicular to an axis about which the rotating member 20 rotates.

Figure 6:
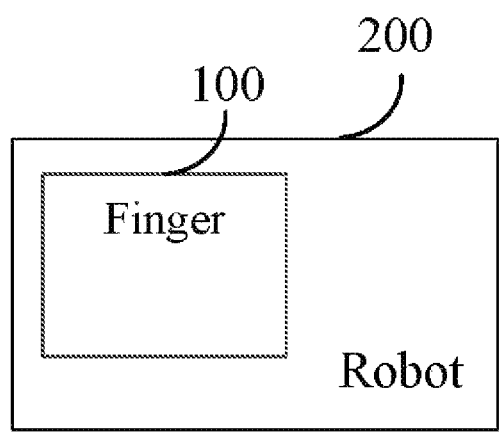
FIG. 6 is a schematic block diagram of a robot including the finger of FIG. 1.

Referring to FIG. 6, in one embodiment, a robot 200 includes the finger 100 as described above.

During operation, the driving device drives the rotating cam 30 to rotate, and the rotating cam 30 then drives the rotating member 20 to rotate. When the rotating member 20 of FIG. 4 rotates in a clockwise direction, the rotating member 20 pulls the rope 40 to move. The rope 40 then pulls the uppermost phalanx 11 to rotate. The phalanx 11 then pulls an adjacent phalanx 11 to rotate toward the rotating member 20, which causes the finger 100 to flex. When the rotating member 20 of FIG. 4 rotates in a counterclockwise direction, two torsion springs, which will be described in detail later, will rebound and cause the two phalanxes 11 to rotate away from the connection assembly 30, which causes the finger 100 to extend.

The finger above has the following advantages: The finger requires less components and its structure is simple. Flexion and extension of the finger can be achieved through engagement of the rope 40, the rotating member 20, the rotating cam 30 and the elastic member 50. By selecting a proper elastic member 50, desirable bending state of the finger can be realized with one degree of freedom. The finger can flex so as to avoid damage from hard shocks. The driving device 50 can be set to operate at a non-limit state, which effectively avoid damage due to failure of the driving device 50. Because of the elastic member 50, the finger can always be flexed to avoid damage caused by hard impact when the finger are subjected to any external force.

The driving device can be set to operate at a non-limit state, which effectively avoid damage due to failure of the driving device.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A finger of a robotic hand, comprising:
   a phalanx portion comprising at least two phalanxes rotatably coupled to each other;
   a rotating member that is rotatable with respect to the phalanx portion;
   a rope comprising two opposite ends respectively connected to one of the at least two phalanxes and the rotating member, the rope being configured to pull one of the at least two phalanxes to rotate;
   a rotating cam driven by a driving device and comprising a lateral surface that stays in contact with the rotating member, the rotating cam being configured to push the rotating member to rotate the rotating member in a first direction; and
   an elastic member connected to the rotating member and configured to apply a force to the rotating member to rotate the rotating member in a second direction, the second direction being different from the first direction;
   wherein when the rotating member rotates in one of the first direction and the second direction, the rope is pulled by the rotating member and then pulls the one of the at least two phalanxes to rotate.

2. The finger according to claim 1, further comprising a base and an axle protruding from the base, wherein the rotating member defines a mounting hole, the axle is rotatably fit in the mounting hole so as to rotatably connect the rotating member to the base.

3. The finger according to claim 2, further comprising a post protruding from a side of the base where the axle is located, wherein the post is spaced apart from the axle and connected to the phalanx portion, two opposite ends of the elastic member are respectively connected to the post and the rotating member.

4. The finger according to claim 1, further comprising an axle, wherein each of the at least two phalanxes defines an axle hole, the axle is fixed in the axle hole of one of the at least two phalanxes and rotatably fit in the axle hole of the other one of the at least two phalanxes.

5. The finger according to claim 4, further comprising a torsion spring, wherein the torsion spring is arranged around the axle and comprises two arms respectively abutting against the at least two phalanxes.

6. The finger according to claim 1, wherein each of the at least two phalanxes comprises a protruding tab, the protruding tab defines a through hole that allows the rope to pass therethrough.

7. The finger according to claim 6, wherein the rotating member defines a cavity, the rope comprises two heads at opposite ends thereof, one of the two heads is received in the cavity so as to connect the rope to the rotating member, and the other one of the two heads abuts against one of the tabs, which allows the rope to apply a pulling force to the one of the tabs.

8. The finger according to claim 1, wherein the elastic member is connected to a first end of the rotating member, and one of the ends of the rope is connected to a second end of the rotating member which is opposite the first end.

9. The finger according to claim 1, wherein the at least two phalanxes rotate about an axis that is perpendicular to an axis about which the rotating member rotates.

10. A robot comprising a hand that comprises a finger, the finger comprising:
    a phalanx portion comprising at least two phalanxes rotatably coupled to each other;
    a rotating member that is rotatable with respect to the phalanx portion;
    a rope comprising two opposite ends respectively connected to one of the at least two phalanxes and the rotating member, the rope being configured to pull one of the at least two phalanxes to rotate;
    a rotating cam driven by a driving device and comprising a lateral surface that stays in contact with the rotating member, the rotating cam being configured to push the rotating member to rotate the rotating member in a first direction; and
    an elastic member connected to the rotating member and configured to apply a force to the rotating member to rotate the rotating member in a second direction, the second direction being different from the first direction;
    wherein when the rotating member rotates in one of the first direction and the second one direction, the rope is pulled by the rotating member and then pulls the one of the at least two phalanxes to rotate.

* * * * *